(12) United States Patent
Qi et al.

(10) Patent No.: US 9,581,387 B2
(45) Date of Patent: Feb. 28, 2017

(54) METHOD FOR IRON-MAKING WITH FULL OXYGEN AND HYDROGEN-RICH GAS AND EQUIPMENT THEREOF

(71) Applicants: CENTRAL IRON & STEEL RESEARCH INSTITUTE, Haidian District Building (CN); SHANDONG TIEXIONG METALLURGICAL TECHNOLOGY CO., LTD., Shandong (CN); SHANDONG COKING GROUP CO., LTD., Shandong (CN)

(72) Inventors: Yuanhong Qi, Haidian District Beijing (CN); Qingtao Wang, Shandong (CN); Dingliu Yan, Haidian District Beijing (CN); Peimin Guo, Haidian District Beijing (CN)

(73) Assignees: CENTRAL IRON & STEEL RESEARCH INSTITUTE, Haidan District Beijing (CN); SHANDONG TIEXIONG METALLURGICAL TECHNOLOGY CO., LTD., Shandong (CN); SHANDONG COKING GROUP CO., LTD., Shandong (CN)

( * ) Notice: Subject to any disclaimer, the term of this patent is extended or adjusted under 35 U.S.C. 154(b) by 199 days.

(21) Appl. No.: 14/622,105

(22) Filed: Feb. 13, 2015

(65) Prior Publication Data

US 2015/0159952 A1 Jun. 11, 2015

Related U.S. Application Data

(62) Division of application No. 13/497,855, filed as application No. PCT/CN2010/076462 on Aug. 30, 2010, now Pat. No. 8,986,601.

(30) Foreign Application Priority Data

| Nov. 24, 2009 | (CN) | 2009 1 0223598 |
| Mar. 10, 2010 | (CN) | 2010 1 0120801 |
| Apr. 14, 2010 | (CN) | 2010 1 0146443 |

(51) Int. Cl.
*C21B 3/02* (2006.01)
*C21B 5/00* (2006.01)
(Continued)

(52) U.S. Cl.
CPC .............. *F27B 1/20* (2013.01); *C21B 3/02* (2013.01); *C21B 3/06* (2013.01); *C21B 5/001* (2013.01);
(Continued)

(58) Field of Classification Search
CPC .. C21B 3/02; C21B 5/001; C21B 5/008; C21B 5/05; C21B 7/002; C21B 2100/06
See application file for complete search history.

(56) References Cited

U.S. PATENT DOCUMENTS

| 4,913,406 | A | * | 4/1990 | Fukushima | C21B 5/006 266/176 |
| 6,986,800 | B2 | | 1/2006 | Duarte-Escareno et al. | |
| 2011/0282494 | A1 | * | 11/2011 | Tockert | C21B 5/008 700/274 |

FOREIGN PATENT DOCUMENTS

| CN | 1055390 A | 10/1991 |
| CN | 2398596 Y | 9/2000 |

(Continued)

OTHER PUBLICATIONS

International Search Report for PCT/CN2010/076462, English translation attached to original, Both completed by the Chinese Patent Office on Nov. 5, 2010, All together 14 Pages.

(Continued)

*Primary Examiner* — George Wyszomierski
*Assistant Examiner* — Tima M McGuthry Banks
(74) *Attorney, Agent, or Firm* — Brooks Kushman P.C.

(57) ABSTRACT

A method of ironmaking using full-oxygen hydrogen-rich gas which includes hot transferring and hot charging the high-temperature coke, sinter and pellet into the ironmaking furnace through transferring and charging device, and inject- (Continued)

ing oxygen and hydrogen-rich combustible gas at a predetermined temperature into the ironmaking furnace through the oxygen tuyere and the gas tuyere disposed at the ironmaking furnace, respectively. It also provides an apparatus for ironmaking using full-oxygen hydrogen-rich gas which includes a raw material system, a furnace roof gas system, a coke oven gas injecting system, a dust injecting system, a slag dry-granulation and residual heat recovering system and an oxygen system. Additionally an apparatus and method for hot transferring and hot charging of ironmaking raw material is disclosed.

11 Claims, 2 Drawing Sheets

(51) Int. Cl.
    *C21B 5/06*     (2006.01)
    *C21B 7/00*     (2006.01)
    *F27B 1/20*     (2006.01)
    *C21B 3/06*     (2006.01)

(52) U.S. Cl.
    CPC .............. *C21B 5/006* (2013.01); *C21B 5/008* (2013.01); *C21B 5/06* (2013.01); *C21B 7/002* (2013.01); *C21B 2100/02* (2013.01); *C21B 2100/04* (2013.01); *C21C 2100/06* (2013.01); *Y02P 10/265* (2015.11); *Y02P 10/283* (2015.11); *Y02P 10/286* (2015.11); *Y02W 30/543* (2015.05)

(56) References Cited

FOREIGN PATENT DOCUMENTS

| | | |
|---|---|---|
| CN | 1487097 A | 4/2004 |
| CN | 1632136 A | 6/2005 |
| CN | 1920380 A | 2/2007 |
| CN | 201241072 Y | 5/2009 |
| CN | 101805811 A | 8/2010 |
| DE | 2633117 A1 | 1/1978 |
| IT | 1046538 B | 7/1980 |
| JP | 52088203 A | 7/1977 |
| JP | 62247035 A | 10/1987 |
| SU | 1126605 A1 | 11/1984 |

OTHER PUBLICATIONS

Rong et al. "Pelletizing Production with Using Mixture of BF Gas and BOF Gas in Jiugang", Sintering and Pelletizing Aug. 2008, vol. 33, No. 4, English translation attached to original, All together 5 Pages.

Wenquan et al. "Practical Blast Furnace Ironmaking Technique" Metallurgical Industry Press Jun. 2002, p. 212-213, English Translation attached to original, All together 5 Pages.

Machine translation of KR 2001019721 A Published Mar. 15, 2001.

\* cited by examiner

METHOD FOR IRON-MAKING WITH FULL OXYGEN AND HYDROGEN-RICH GAS AND EQUIPMENT THEREOF

CROSS-REFERENCE TO RELATED APPLICATIONS

This application is a division of U.S. patent application Ser. No.: 13/497,855, filed Mar. 23, 2012, now U.S. Pat. No. 8,986,601 issued Mar. 24, 2015, which claims priority to U.S. National Stage Entry No. PCT/CN2010/076462, filed Aug. 30, 2010, which claims priority to Chinese Application. No. 200910223598.X, filed Nov. 24, 2009, Chinese Application. No. 201010120801.3, filed Mar. 10, 2010 and Chinese Application No. 201010146443.3, filed Apr. 14, 2010, the disclosures of which are hereby incorporated in their entirety by reference herein.

FIELD OF THE INVENTION

The present invention relates to ironmaking and energy resources technical fields, particularly to a method and an apparatus for ironmaking to realize hot transferring and hot charging of ironmaking raw material and making iron with low-carbon full-oxygen hydrogen-rich gas.

DESCRIPTION OF RELATED ART

With the rapid development of modern industry, global energy resources are consumed vastly, and the amount of $CO_2$ emissions is increased sharply, resulting in air pollution and greenhouse effect, which has threatened the global environment on which humans survive. In China, the amount of $CO_2$ emissions in iron and steel industry is only second to that in electric power. Therefore, $CO_2$ emission reduction is very important for iron and steel industry. Ironmaking system, of which the energy consumption is more than 70% of the overall energy consumption in the iron and steel production, is the key object of saving energy and reducing emission. However, it is hard to save energy and reduce emission greatly in the processes of coking, sintering, pelletizing and various other processes under the current technology level, therefore, the technology innovation is urgently needed to achieve the goals of saving energy and reducing emission.

Raw materials for ironmaking of blast furnace mainly include coke, sinter and pellet. At present, charges of blast furnace are charged into furnace at atmospheric temperature. Although the charges at an atmospheric temperature are good for transportation, reposition and use, materials need to be cooled to the atmospheric temperature from high temperature through cooling apparatus during producing process, and need to be reheated to high temperature after being charged into blast furnace, which increases the cost for apparatus and requires large place for the apparatus and waste great mount of thermal energy.

Generally, red coke pulled out from coke oven has a temperature about 800-1200° C. At present, there are mainly two ways of coke dry quenching and coke wet quenching that cool the coke to atmospheric temperature. No matter which way of quenching is used, the stress crack will be introduced in the coke due to great change of temperature, such that strength and yield of the coke are decreased. Although coke dry quenching process may collect sensible heat of the coke to generate electric power, the energy recovery ratio is low; coke wet quenching process quenches the coke by water injected from coke quenching tower, which makes the sensible heat of the coke totally wasted without any utilization, large amount of water resources consumed, and the environment polluted to some extent.

In general, un-cooled high-temperature sinter has a temperature of about 800-1000° C., and un-cooled high-temperature pellet has a temperature of about 800-1400° C. At present, they are cooled mainly through belt cooler or circular cooler, during which the sensible heat thereof is utilized through residual heat boiler to generate low pressure stream. However, the energy recovery ratio is low as well.

Blast furnace has got good effects on the aspects of increasing yield, saving coke and reducing energy consumption by using high oxygen-rich and greatly injecting coal. When the ratio of oxygen-rich further raises to be able for pure oxygen smelting, the maximum of injecting coal can be achieved, coke ratio is decreased, but the consequent problems are in that: the amount of gas in blast furnace is under sufficient; and the temperature of the upper portion is low because cold materials are charged into furnace, thus influences indirect reduction of gas which makes direct reduction ratio and unintended loss of carbon increased. Although the problem that thermal energy in the upper portion is insufficient may be solved by presently popular technical concept, that is, injecting high-temperature gas at the lower portion of the furnace, this technical concept is only in the stage of being a conceived design, since there is a problem of carbon deposition during heating process and a certain amount of gas needs to be additionally provided.

SUMMARY OF THE INVENTION

In order to solve the above problems, the purpose of the present invention is to provide a method and an apparatus for ironmaking using full-oxygen hydrogen-rich gas, and more specifically, to provide an ironmaking process and related apparatus on the basis of processes of coking, sintering, pelletizing and ironmaking furnace which use smelting technology of injecting full-oxygen and hydrogen-rich gas, so as to obtain the effects of clean product, energy efficiency and environmentally friendly emission.

The method of ironmaking using full-oxygen and hydrogen-rich gas according to the present invention includes: running the processes of coking, sintering, pelletizing with them coupled with each other, in which the ironmaking furnace, coke, sinter and pellet are not quenched, but hot transferred and hot charged into the ironmaking furnace at high temperature through transferring and charging devices. Oxygen tuyere and gas injecting facilities are disposed at the lower portion of the ironmaking furnace, so as to inject oxygen and hydrogen-rich combustible gas with a predetermined temperature into the ironmaking furnace. The gas tuyere is disposed at the middle and lower portion of the ironmaking furnace, so as to inject hydrogen-rich combustible gas with a predetermined temperature into the ironmaking furnace. Thus the above object can be achieved by using hydrogen-rich combustible gas instead of coke and coal. Gas with high temperature and high heat value that is discharged from upper portion of the ironmaking furnace transfers the physical heat to hydrogen-rich combustible gas being injected into the furnace through regenerative heat exchanger, then the gas is provided for producing coke, sinter and pellet. Here, the hydrogen-rich combustible gas includes coke oven gas, natural gas and other types of hydrogen-rich combustible gas.

An embodiment of the present invention provides a method of ironmaking using full-oxygen and hydrogen-rich gas, comprising: 1) directly transferring mature hot red coke manufactured by a coke oven into a high temperature coke transmit silo by a high temperature coke transferring device, directly transferring high temperature sinter manufactured by a sintering machine into a high temperature sinter transmit silo by a closed high temperature sinter transferring device, and directly transferring high temperature pellet manufactured by a pellet firing machine into a high temperature pellet transmit silo by a closed high temperature pellet transferring device;

2) sequentially transporting high temperature charges in a certain ratio into the high temperature resistant furnace roof in batch through high temperature weighing hoppers and the closed high temperature charge transferring device sequentially by using the three high-temperature transmit silos as buffering and thermal insulating containers for the high temperature coke, sinter and pellet, and then distributing the high temperature charges into ironmaking furnace via the high temperature resistant furnace roof according to the actual requirement, wherein there are two rows of tuyeres disposed in the ironmaking furnace, which are a lower row of oxygen tuyeres at a lower portion thereof and an upper row of gas tuyeres at a middle and lower portion thereof;

3) controlling charging temperatures of the coke, sinter and pellet to be 100° C.~1200° C., 100° C.~1000° C. and 100° C.~1400° C., respectively, by using buffering and thermal insulating functions of the three transmit silos, wherein the charging temperatures of the coke, sinter and pellet may respectively be 300-1000° C., 300-900° C. and 300-1000° C., preferably, all the charging temperatures of the coke, sinter and pellet may be 500-800° C.;

4) injecting 200-600 m$^3$/ton iron of oxygen and 20-300 m$^3$/ton iron of preheated hydrogen-rich combustible gas into the ironmaking furnace through the lower row of oxygen tuyere disposed in the lower portion of the ironmaking furnace, and injecting 100-600 m$^3$/ton iron of preheated hydrogen-rich combustible gas into the ironmaking furnace at a position disposed in the middle and lower portion of the ironmaking furnace, that is, a portion above a root of a cohesive zone, at the same time, hydrogen-rich combustible gas being coke oven gas or natural gas, temperature of injected hydrogen-rich combustible gas being controlled to be in a range of 600-1200° C.;

5) dedusting gas discharged from the furnace roof with a temperature of 250-1200° C. through a furnace roof-high temperature gas dust removing device 4, followed by subjected to exchanging heat through 4-6 regenerative heat exchanging devices, so as to recover sensible heat of the gas, wherein 2-3 regenerative heat exchanging devices are used for preheating hydrogen-rich combustible gas which is injected into the furnace at the portion above the root of the cohesive zone, and the other 2-3 regenerative heat exchanging devices are used for preheating hydrogen-rich gas which is injected into the furnace through the oxygen tuyere;

6) reducing the temperature of the gas discharged from the furnace roof to 200° C. or less after passing through the 4-6 regenerative heat exchanging devices, followed by subjected to being dedusted through bag dust removing devices, and cleaned gas to exchange the coke oven gas in operating process of the coke oven and for manufacturing pellet and sinter;

7) injecting dust recovered by the furnace roof-high temperature gas dust removing device and 4-30 bag dust removing devices into the ironmaking furnace from the oxygen tuyeres of the ironmaking furnace through the dust injecting tank, so as to eliminate dust pollution; and 8) granulating high temperature liquid slag generated by the ironmaking furnace through slag granulation and heat exchanging device, and recovering sensible heat of the slag to generate high pressure steam through the boiler, wherein the high pressure steam drives a combined power generating device in combination with the gas discharged from the furnace roof to generate electric power.

The present invention uses a hot charging of charge which utilizes the thermal energy sufficiently, so as to allow upper portion lump material belt in the temperature range for a reduction reaction, such that metallic ratio of charge reaches to 70% or more through the upper of the furnace; uses hot charging coupled with full-oxygen smelting, so as to allow thermal energy distribution reasonably uniform generator is driven to generate electric power by the recovery of the sensible heat of slag in conjunction with the recovery of furnace roof residual pressure, such that improves efficiency of electric power generation.

Another embodiment aspect of the present invention provides an apparatus to realize the method of ironmaking using full-oxygen and hydrogen-rich gas, which includes an ironmaking furnace, a raw material system connected with the ironmaking furnace through a high temperature resistant bell-less furnace roof, a furnace roof gas system connected with the ironmaking furnace through pipelines, a coke oven gas injecting system connected with the ironmaking furnace through the pipelines, a dust injecting system connected with the ironmaking furnace through the pipelines, a slag dry-granulation and a residual heat recovering system connected with the ironmaking furnace through a slag-iron runner, and an oxygen system connected with the ironmaking furnace through the pipelines.

The raw material system is consist of the coke oven, the sintering machine, the pellet firing machine, the high temperature coke transferring device, the high temperature sinter transferring device, the high temperature pellet transferring device, the high temperature coke transit silo, the high temperature sinter transit silo, the high temperature pellet transit silo, the high temperature coke weighing hopper, the high temperature sinter weighing hopper, the high temperature pellet weighing hopper, the high temperature charge transferring device, and the high temperature resistant bell-less furnace roof.

The coke oven is connected with the high temperature coke transit silo through the high temperature coke transferring device. The sintering machine is connected with the high temperature sinter transit silo through the high temperature sinter transferring device. The pellet firing machine is connected with the high temperature pellet transit silo through the high temperature pellet transferring device. The high temperature weighing hoppers are respectively connected with the corresponding transit silos of coke, sinter and pellet through pipelines or closed chute. The high temperature weighing hoppers are connected with the high temperature charge transferring device through pipelines or closed chute. The high temperature charge transferring device is connected with the ironmaking furnace through the high temperature resistant bell-less furnace roof.

The furnace roof gas system is consist of the furnace roof-high temperature gas dust removing device, the 4-6 regenerative heat exchanging devices, the 4-30 bag dust removing devices, the combined power generating device, and the gas storage device. The ironmaking furnace is connected with the high temperature gas dust removing device through pipelines. The furnace roof-high temperature gas dust removing device, the regenerative heat exchanging devices, the bag dust removing devices, the combined power generating device, and the gas storage device are connected sequentially through pipelines.

The coke oven gas injecting system is consist of the coke oven, the coke oven gas cleaning system, a first pressurized gas blower, a second pressurized gas blower, the regenerative heat exchanging devices, and the gas injection temperature-adjusting device. The coke oven is connected with the coke oven gas cleaning system. The gas are transferred in two paths after being cleaned by the coke oven gas cleaning system, one of which is connected sequentially with the pressurized gas blower, the regenerative heat exchanging device, the gas injection temperature-adjusting device and ironmaking furnace through pipelines, and the other of which is connected sequentially with the pressurized gas blower, the regenerative heat exchanging device and the ironmaking furnace.

The dust injecting system is consist of the furnace roof-high temperature gas dust removing device, the bag dust removing devices, and the dust injecting tank. The furnace roof-high temperature gas dust removing device is connected with dust injecting tank through dust transferring device. The bag dust removing devices is connected with dust injecting tank through dust transferring device, and the dust injecting tank is connected with the ironmaking furnace.

The slag dry-granulation and residual heat recovering system includes the slag-iron separator, the slag granulation and heat exchanging device, the boiler, the blower, and the combined power generating device.

Slag-iron flows to the slag-iron separator through a slag-iron runner from the ironmaking furnace, which is divided into a liquid slag flow connected with the slag granulation and heat exchanging device through a slag runner, and a molten iron flow connected with the molten iron transporting device through an iron runner. The blower is connected with the slag granulation and heat exchanging device through the pipelines. The slag granulation and heat exchanging device is connected with the boiler through the pipelines, and is connected with the slag transferring device through a blanking pipe. The boiler is connected with the combined power generating device along with the residual heat through the pipelines.

The regenerative heat exchanging device may be a regenerative heat exchanger or a heat-exchanging type heat exchanger.

Two rows of tuyeres are disposed in the ironmaking furnace, which are the lower row of oxygen tuyeres at the lower portion and the upper row of gas tuyeres at the middle and lower portion.

A still another embodiment of the present invention provides a device for hot transferring and hot charging of ironmaking raw material of blast furnace, which includes a carbonization chamber of coke oven, a sintering machine, a pellet firing machine, a blast furnace, a red coke transit tank, a hot sinter transit tank, a hot pellet transit tank, a red coke transport wagon, a hot sinter transport wagon, a hot pellet transport wagon and a material transporting and hoisting device.

The carbonization chamber of coke oven is connected with the red coke transit tank through the red coke transport wagon. The sintering machine is connected with the hot sinter transit tank through the hot sinter transport wagon. The pellet firing machine is connected with the hot pellet transit tank through the hot pellet transport wagon.

The red coke transit tank, the hot sinter transit tank, the hot pellet transit tank are connected with the blast furnace through the material transporting and hoisting device, respectively.

Each of the transit tanks may have a lining of an impact-resistant thermal insulation material, and a sealing cover disposed in the inlet of the transit tank and having a thermal insulation material disposed therein facing the tank, and has a shape such as square, rectangular, oval, cylindrical or circular shape.

The material transporting and hoisting device may be a vertical-horizontal hoisting device or a skew bridge hoisting device.

A yet another embodiment of the present invention provides a method for hot transferring and hot charging of ironmaking raw material of blast furnace which uses the apparatus for hot transferring and hot charging of ironmaking raw material of blast furnace. The method comprises: transporting mature red coke pulled out from the carbonization chamber of the coke oven into the red coke transit tank through the red coke transport wagon, transporting hot sinter generated from the sintering machine into the hot sinter transit tank through the hot sinter transport wagon, and transporting hot pellet generated from the pellet firing machine into the hot pellet transit tank through hot pellet transport wagon; and transferring red coke, hot sinter and hot pellet in a certain ratio to the blast furnace in turn and in batch through the material transporting and hoisting apparatus by using the above-mentioned transit tanks respectively as buffering and thermal insulating containers for the red coke, hot sinter and hot pellet, wherein the temperatures of the red coke, sinter, pellet and lump ore charged into the blast furnace are controlled to be 100-1200° C., 100-1000° C., 100-1400° C. and an atmospheric temperature, respectively, by using buffering and thermal insulating effects of the above transit tanks. The charging temperatures of the coke, sinter and pellet may respectively be 300-1000° C., 300-900° C. and 300-1000° C., preferably, all the charging temperatures of the coke, sinter and pellet may be 500-800° C.

A yet another embodiment of the present invention provides an apparatus used for hot transferring and hot charging of ironmaking raw material including coke hot transferring and hot charging device. The coke hot transferring and hot charging device is consist of a coke oven, a high temperature coke transferring device, a high temperature coke transit silo, a high temperature coke weighing hopper, a high temperature charge transferring device, and a high temperature resistant furnace roof.

The coke oven is connected with the high temperature coke transit silo through the high temperature coke transferring device. The high temperature coke weighing hopper is connected with the coke transit silos through pipelines or closed chute. The high temperature coke weighing hopper is connected with the high temperature charge transferring device through pipelines or closed chute. The high temperature charge transferring device is connected with the ironmaking furnace through the high temperature resistant furnace roof.

The apparatus further includes a sinter hot transferring and hot charging device or a pellet hot transferring and hot charging device. The sinter hot transferring and hot charging device is consist of a sintering machine, a high temperature sinter transferring device, a high temperature sinter transit silo and a high temperature sinter weighing hopper. The sintering machine is connected with the high temperature sinter transit silo through the high temperature sinter transferring device. The high temperature sinter weighing hopper is connected with the high temperature sinter transit silos through pipelines or closed chute. The high temperature sinter weighing hopper is connected with the high temperature charge transferring device through pipelines or closed chute. The pellet hot transferring and hot charging device is consist of a pellet firing machine, a high temperature pellet transferring device, a high temperature pellet transit silo and a high temperature pellet weighing hopper. The pellet firing machine is connected with the high temperature pellet transit silo through the high temperature pellet transferring device. The high temperature pellet weighing hopper is connected with the high temperature pellet transit silos through pipelines or closed chute. The high temperature pellet high temperature weighing hopper is connected with the high temperature charge transferring device through pipelines or closed chute.

A yet another embodiment of the present invention provides a method for hot transferring and hot charging of ironmaking raw material, which comprises: directly transferring mature coke manufactured by the coke oven to the high temperature coke transit silo by the high temperature coke transferring device without being quenched; and transporting the high temperature coke into the high temperature resistant furnace roof through the high temperature coke weighing hopper and the closed high temperature charge transferring device sequentially by using the high temperature coke transit silo as buffering and thermal insulating containers for the high temperature coke, and then distributing the high temperature coke into ironmaking furnace via the high temperature resistant furnace roof according to the actual requirement.

The method for hot transferring and hot charging of ironmaking raw material according to the present invention may further comprise transporting the high temperature coke together with the high temperature sinter into the ironmaking furnace, or transporting the high temperature coke together with the high temperature pellet into the ironmaking furnace. In this method, the temperatures of coke, sinter and pellet charged into the ironmaking furnace are 100° C.-1200° C., 100-1000° C. and 100-1400° C., respectively. In addition, the charging temperatures of the coke, sinter and pellet may be 300-1000° C., 300-900° C. and 300-1000° C., respectively. Preferably, all the charging temperatures of the above material may be 500-800° C. In the present invention, the temperatures of the raw materials charged into the ironmaking furnace are the charging temperatures of the raw material.

Compared with the prior art, the present invention has the following advantages:

1. Coke, sinter and pellet, temperatures of which are respectively in 100-1200° C., 100-1000° C. and 100-1400° C., are directly charged into the ironmaking furnace, such that sensible heat of the materials are utilized sufficiently, fluctuation of the temperature of the materials is reduced, and the investment of cooling device for the materials is saved.

Since coke is not quenched, pollution caused by coke wet quenching process is eliminated, the stress crack of coke due to great change of temperature is eliminated consequently, the strength of coke is improved, M40 is increased by 3%-8%, M10 is decreased by 0.3%-0.8%, and the amount of broken coke and dust coke is reduced.

2. Since the materials are charged into furnace at high temperature, plenty of physical heat of the materials is supplied to ironmaking furnace to replenish thermal energy loss of the upper portion which is caused by insufficient amount of gas. The amount of physical heat may reach 1.59 GJ, given that temperatures of coke, sinter and pellet are 800° C., and their consumption amounts per ton iron are respectively 0.3 t, 1.28 t and 0.32 t.

Since the upper portion uses hot charging of charges, lump material belt at the upper portion is entirely in the indirect-reduction temperature range, thus the charges being at the indirect-reduction status once entering into the ironmaking furnace. Therefore, time for reduction reaction is relatively extended, and the effect of indirect reduction is improved.

3. The process of providing hydrogen-rich reductive gas which is coke oven gas preheated to 600-1100° C. and injected from upper row gas tuyere, has improved the reduction potential of the upper portion gas and dynamic conditions of the reduction of the upper portion, such that the indirect reduction of the upper portion is conducted sufficiently, and the metallic ratio of the charges entering into the lower portion of the ironmaking furnace reaches 90% or more. Since gaseous product generated by reducing the charges with hydrogen is water, hydrogen-rich reduction decreases the emission of $CO_2$.

4. Traditional blast furnace uses hot blast, the amount of which reaches 1600 $m^3$ per ton iron, wherein $N_2$ takes up 1000 $m^3$ in the overall amount; in the present invention, industrial oxygen is blown through oxygen tuyere of the hearth, which decreases gas generated in the hearth, and decreases the requirement for air permeability of stock column.

Coke oven gas is blown through hearth at the same time and theoretical combustion temperature in front of tuyere may be decreased by utilizing decomposition of methane in coke oven gas. Gas generated by the decomposition and hydrogen that exists inherently in coke oven gas improve the amount of hydrogen in hearth, such that the direct reduction of C may be partially substituted by indirect reduction of hydrogen in the lower portion, heat loss of direct reduction is decreased, and the objects of energy saving and coke saving are achieved. The amount of furnace slag which is taken in by the large amount of the injected coal dust and the amount of slag which is taken by the additionally added flux which is used for balancing alkalinity are decreased via injecting coke oven gas instead of injecting coal dust, so as to decrease the amount of furnace slag per ton iron and achieve the object of energy saving.

5. With the sufficient conduction of indirect reduction in ironmaking furnace, the metallic ratio is 70% before the charges entering into the melting region of the lower portion; the ironmaking process may be completed substantially depends on melting and carburization in the hearth besides the small amount of additional reduction; carburization reaction is progressed ahead of time due to high metallic ratio of the upper portion, the carburization time are decreased, the utilization coefficient of blast furnace may be improved greatly, and the yield of furnace capacity may reach 1.5 times than that of normal blast furnace.

6. Metal oxides in the charges with low boiling point such as K, Na, Zn and so on, are reduced to metal and then escape from the furnace via high temperature gas, so as to decrease the circular accumulation and reduce the nodulation phenomenon of furnace lining. Also, air permeability of stock column is improved without deposition of dust of alkaline-earth metal.

7. Residual heat of furnace slag are recovered by fry granulation and stream generated by boiler and the high pressure gas of furnace roof are used to drive TRT (Blast Furnace Roof Gas Recovery Turbine Unit) to generate electric power, so that the residual heat of blast furnace slag is utilized, water resources is saved, and the efficiency of generating electric power by using single gas is improved, wherein the amount of the saved water per ton iron may reach 0.5 t or more.

MAIN REFERENCE NUMERALS

Figure 1:
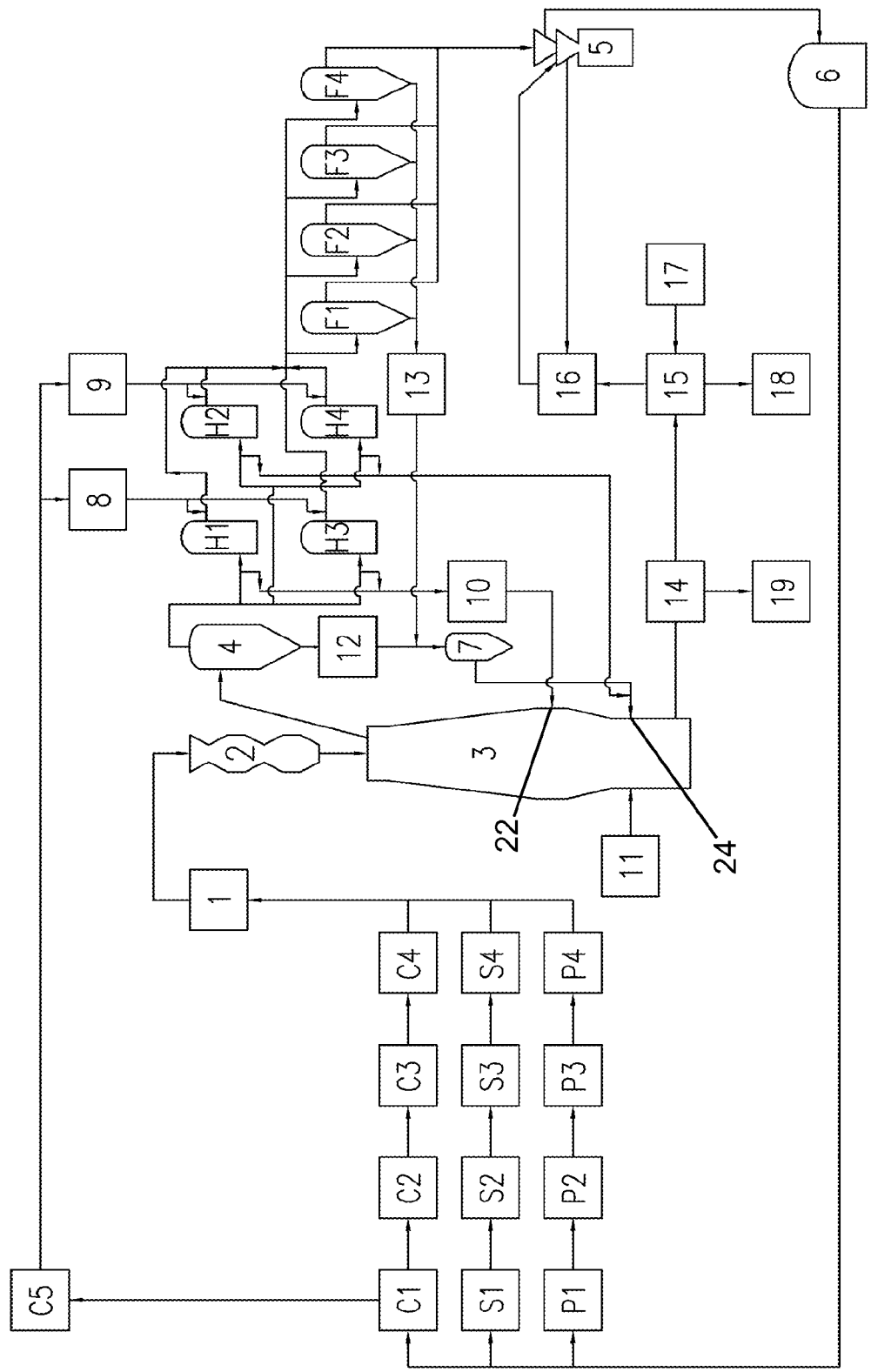
FIG. 1 is a structural schematic diagram illustrating a method and an apparatus for ironmaking using full-oxygen hydrogen-rich gas according to the present invention.

1: high temperature charge transferring device;
2: high temperature resistant bell-less furnace roof;
3: ironmaking furnace;
4: furnace roof-high temperature gas dust removing device;
5: combined power generating device;
6: gas storage device;
7: dust injecting tank;
8, 9: pressurized gas blower;
10: gas injection temperature-adjusting device;
11: oxygen system;
12, 13: dust transferring device;
14: slag-iron separator;
15: slag granulation and heat exchanging device;
16: boiler;
17: blower;
18: slag transferring device;
19: molten iron transferring device;
B1: carbonization chamber of coke oven;
B2: sintering machine;
B3: pellet firing machine;
B4: blast furnace;
40: red coke transit tank;
20: hot sinter transit tank;
30: hot pellet transit tank;
100: red coke transport wagon;
200: hot sinter transport wagon;
300: hot pellet transport wagon; and
400: material transporting and hoisting device.

DETAILED DESCRIPTION OF THE PREFERRED EMBODIMENTS

Hereinafter, the present invention will be explained and described in more detail in connection with the accompanying drawings and specific embodiments.

Embodiment 1

Referring to the schematic diagram of the method of ironmaking using full-oxygen and hydrogen-rich gas in FIG. 1, a manufacturing process of the method of ironmaking using full-oxygen and hydrogen-rich gas can be implemented as follows.

Mature red coke pulled out by a coke oven C1 is directly transferred into a high temperature coke transmit silo C3 by a high temperature coke transferring device C2 without being quenched, high temperature sinter manufactured by a sintering machine S1 is directly transferred into a high temperature sinter transmit silo S3 by a closed high temperature sinter transferring device S2 without being cooled by a belt cooler or a circular cooler, and high temperature pellet manufactured by a pellet firing machine P1 is directly transferred into a high temperature pellet transmit silo P3 by a closed high temperature pellet transferring device P2 without being cooled by a belt cooler or a circular cooler. High temperature weighing hoppers C4, S4 and P4 are respectively disposed under the transmit silos of the above three charges, such that the three charges in a certain ratio are sequentially added into a high temperature charge transferring device 1, and raised into a high temperature resistant bell-less furnace roof 2 by the high temperature charge transferring device 1, and then distributed into an ironmaking furnace 3 by the high temperature resistant bell-less furnace roof 2 according to the actual requirements.

The transmit silos C3, S3 and P3 are steel structure silos, each of which has a lining of an impact-resistance thermal insulation material or a combination of a thermal insulation material and a heat resistant lining plate, and a sealing cover disposed in an inlet of each silo and having a thermal insulation material disposed on a side thereof facing the silo. By using buffering and thermal insulating functions of the high temperature transmit silos C3, S3 and P3, the present invention can control the temperatures of coke, sinter and pellet charged into the ironmaking furnace to be 100° C.~1200° C., 100° C.~1000° C. and 100° C.~1400° C., respectively, wherein, the charging temperature of the pellet can also be 100° C~1000° C. In addition, the charging temperature of the coke may be controlled to be 300-1000° C., preferably, 500-800° C.; the charging temperature of the sinter may be controlled to be 300-900° C., preferably, 500-800° C.; and the charging temperature of the pellet may be controlled to be 300-1000° C., preferably, 500-800° C. The high temperature charge transferring device 1 is a closed high-temperature chain-plate machine or a combination of a closed wagon and skew bridges. In this embodiment, the charging temperatures of all the above-mentioned raw materials can be 300° C., 500° C., 800° C., 900° C., 1000° C., 1200° C., 1400° C., or each of the temperatures in the above ranges of charging temperatures of the coke, sinter and pellet, all of which can achieve the object of hot transferring and hot charging of raw materials in the present invention.

There are two rows of tuyeres disposed in the ironmaking furnace 3, which are a lower row of oxygen tuyeres 22 at the lower portion of the ironmaking furnace and an upper row of gas tuyeres 24 at the middle and lower portion of the ironmaking furnace. After the charges reach to a predetermined height in the furnace, oxygen is injected into the ironmaking furnace 3 through the lower row of oxygen tuyeres disposed at the lower portion of the ironmaking furnace 3, meanwhile, a predetermined ratio of hydrogen-rich combustible gas is injected; that is, 200-600 m$^3$/ton iron of oxygen and 20-300 m$^3$/ton iron of preheated hydrogen-rich combustible gas are injected. When the charge surface in the furnace reaches to a normal level, 100-600 m$^3$/ton iron of preheated hydrogen-rich combustible gas is injected into the ironmaking furnace 3 through the upper row gas tuyere which is disposed in the middle and lower portion of the ironmaking furnace 3, that is, a portion above the root of a cohesive zone. The hydrogen-rich combustible gas in this embodiment is coke oven gas. Here, the hydrogen-rich combustible gas may also be natural gas, and the injecting temperature of the hydrogen-rich combustible gas is controlled to be in a range of 600-1200° C.

Gas discharged from the ironmaking furnace roof has a temperature of 250-1200° C., and is dedusted through a furnace roof-high temperature gas dust removing device 4, then enters regenerative heat exchanging devices H1 or H3 (H1 and H3 are used alternately) and H2 or H4 (H2 and H4 are used alternately) to exchange heat, so as to recover sensible heat of the gas. The regenerative heat exchanging devices H1 and H3 (H1 and H3 are used alternately) are used for preheating hydrogen-rich combustible gas which is injected into the furnace at the portion above the root of the cohesive zone, and the regenerative heat exchanging devices H2 and H4 (H2 and H4 are used alternately) are used for preheating hydrogen-rich gas which is injected into the furnace through the oxygen tuyere. Here, the number of regenerative heat exchanging devices may be 4-6.

The gas discharged from the furnace roof drops to a temperature of 200° C. or less after passing through 4-6 regenerative heat exchanging devices, and then is further dedusted through bag dust removing devices F1, F2, F3 and F4. Here, the number of bag dust removing devices may be 4-30. The dedusted gas enters into a combined power generating device 5 to generate electric power, and finally enters a gas storage device 6 so as to be provided to gas users for manufacturing coke, sinter, pellet and so on.

Dust generated by the furnace roof-high temperature gas dust removing device 4 is added periodically to a dust injecting tank 7 through a dust transferring device 12, and dust generated by the bag dust removing devices F1, F2, F3 and F4 is added periodically to the dust injecting tank 7 through a dust transferring device 13. Finally, dust is injected into the ironmaking furnace 3 from the lower row of oxygen tuyeres at the lower portion of the ironmaking furnace by the dust injecting tank 7, so as to eliminate dust pollution.

Coke oven gas generated by the coke oven C1 is injected into the ironmaking furnace 3 in two paths after being cleaned by a cleaning system C5. One path is that the coke oven gas is pressurized through a pressurized gas blower 8, exchanged heat through the regenerative heat exchanging device H1 or H3 (H1 and H3 are used alternately) to rise to a temperature of 600-1100° C., adjusted its temperature through an gas injection temperature-adjusting device 10, and then injected into the ironmaking furnace 3 through the upper row of gas tuyeres. The gas injection temperature-adjusting device 10 ensures the gas injected through the upper row of gas tuyeres to have a temperature consistent with that of the process requirement. The other path is pressurized through a pressurized gas blower 9, exchanged heat through the regenerative heat exchanging device H2 or H4 (H2 and H4 are used alternately), and then injected into the ironmaking furnace 3 through the lower row of oxygen tuyeres.

The high temperature liquid slag and molten iron are discharged from an iron notch disposed at the lower portion of the ironmaking furnace 3, and are separated through a slag-iron separator 14. The molten iron enters into a molten iron transporting device 19, and the slag enters a slag granulation and heat exchanging device 15. The slag after granulated and heat exchanged is transported out through a slag transferring device 18, and residual heat of the slag is blown into a boiler 16 by the air of the blower 17 to generate high temperature and high pressure steam, which drives a combined power generating device 5 in combination with the gas discharged from the furnace roof, so as to utilize the thermal energy of the slag sufficiently.

Embodiment 2

Referring to the schematic structural diagram of the apparatus for ironmaking using full-oxygen and hydrogen-rich gas in FIG. 1, the apparatus for ironmaking using full-oxygen and hydrogen-rich gas of the present invention includes an ironmaking furnace, a raw material system connected with the ironmaking furnace 3 through the high temperature resistant bell-less furnace roof 2, a furnace roof gas system connected with the ironmaking furnace 3 through pipelines, a coke oven gas injecting system connected with the ironmaking furnace 3 through the pipelines, a dust injecting system connected with the ironmaking furnace 3 through the pipelines, a slag dry-granulation and residual heat recovering system connected with the ironmaking furnace 3 through a slag-iron runner, and an oxygen system is connected with the ironmaking furnace 3 through pipelines. Two rows of tuyeres are disposed in the ironmaking furnace 3, that is, a lower row of oxygen tuyeres disposed at the lower portion of the ironmaking furnace 3 and an upper row of gas tuyeres disposed at the middle and lower portion of the ironmaking furnace 3.

The raw material system is consist of the coke oven C1, the sintering machine S1, the pellet firing machine P1, the high temperature coke transferring device C2, the high temperature sinter transferring device S2, the high temperature pellet transferring device P2, the high temperature coke transit silo C3, the high temperature sinter transit silo S3, the high temperature pellet transit silo P3, the high temperature coke weighing hopper C4, the high temperature sinter weighing hopper S4, the high temperature pellet weighing hopper P4, the high temperature charge transferring device 1, and the high temperature resistant bell-less furnace roof 2.

The coke oven C1 is connected with the high temperature coke transit silo C3 through the high temperature coke transferring device C2, the sintering machine 51 is connected with the high temperature sinter transit silo S3 through the high temperature sinter transferring device S2, and the pellet firing machine P1 is connected with the high temperature pellet transit silo P3 through the high temperature pellet transferring device P2. The high temperature weighing hoppers C4, S4 and P4 are respectively connected with the corresponding transit silos of the coke, sinter and pellet through pipelines or closed chutes, and are connected with the high temperature charge transferring device 1 through the pipelines or closed chutes, and the high temperature charge transferring device 1 is connected with the ironmaking furnace 3 through the high temperature resistant bell-less furnace roof 2.

The furnace roof gas system is consist of the furnace roof-high temperature gas dust removing device 4, the regenerative heat exchanging devices H1, H2, H3 and H4, the bag dust removing devices F1, F2, F3 and F4, the combined power generating device 5, and the gas storage device 6. The ironmaking furnace 3 is connected with the furnace roof-high temperature gas dust removing device 4 through pipelines, and the furnace roof-high temperature gas dust removing device 4, the regenerative heat exchanging devices H1, H2, H3 and H4, the bag dust removing device Fl, F2, F3 and F4, the combined power generating device 5, and the gas storage device 6 are connected sequentially through pipelines. Furthermore, the number of the regenerative heat exchanging devices may be 4-6, and the number of the bag dust removing devices may be 4-30. The regenerative heat exchanging devices may also be heat-exchanging type heat exchanger.

The coke oven gas injecting system is consist of the coke oven C1, the coke oven gas cleaning system C5, the pressurized gas blower 8, the pressurized gas blower 9, the regenerative heat exchanging devices H1, H2, H3 and H4, and the gas injection temperature-adjusting device 10, wherein the coke oven C1 is connected with the coke oven gas cleaning system C5 through pipelines; and the gas is transferred in two paths after being cleaned by the coke oven gas cleaning system C5, one of which is connected sequentially with the pressurized gas blower 8, the regenerative heat exchanging device H1 and H3, and the gas injection temperature-adjusting device 10, and then is connected with the upper row of gas tuyeres disposed in the middle and lower portion (that is, the portion above the root of the cohesive zone) of the ironmaking furnace 3 through pipelines, and the other of which is connected sequentially with the pressurized gas blower 9 and the regenerative heat exchanging device H2 and H4, and then is connected with the lower row of oxygen tuyeres disposed in the lower portion of the ironmaking furnace 3.

The oxygen system 11 is connected with the ironmaking furnace 3 through the pipelines.

The dust injecting system is consist of the furnace roof-high temperature gas dust removing device 4, the bag dust removing devices F1-F4, and the dust injecting tank 7. The furnace roof-high temperature gas dust removing device 4 is connected with the dust injecting tank 7 through the dust transferring device 12, and the bag dust removing devices F1-F4 is connected with the dust injecting tank 7 through the dust transferring device 13. The dust injecting tank 7 is connected with the lower row of oxygen tuyeres at the lower portion of the ironmaking furnace 3.

The slag dry-granulation and residual heat recovering system is mainly consist of the slag-iron separator 14, the slag granulation and heat exchanging device 15, the boiler 16, the blower 17, and the combined power generating device 5. The slag-iron flows to the slag-iron separator 14 through the slag-iron runner from the ironmaking furnace 3, which is divided into a liquid slag flow connected with the slag granulation and heat exchanging device 15 through a slag runner, and a molten iron flow connected with the molten iron transporting device 19 through an iron runner. The blower 17 is connected with the slag granulation and heat exchanging device 15 through the pipelines. The slag granulation and heat exchanging device 15 is connected with the boiler 16 through the pipelines, and is connected with the slag transferring device 18 through a blanking pipe. The boiler 16 is connected with the combined power generating device 5 along with the residual heat through the pipelines.

The apparatus of the present embodiment can implement that the charging temperatures of the coke, sinter and pellet are respectively 100-1200° C., 100-1000° C. and 100-1400° C.

The following beneficial effects can be obtained by using the ironmaking method of Embodiment 1 and the ironmaking apparatus of Embodiment 2: energy consumption of ironmaking process decreases 10-50%; yield of molten iron increases 50-200%; land resources are saved, and construction investment is reduced; emission of CO2 decreases 15-40%; and the amount of new water decreases 80% or more.

Embodiment 3

Figure 2:
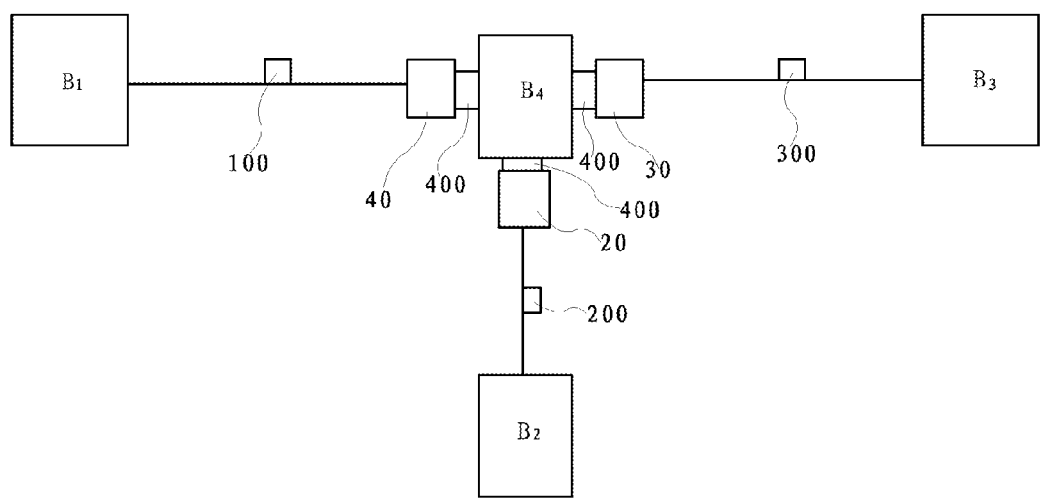
FIG. 2 is a structural schematic diagram illustrating a method and an apparatus for hot transferring and hot charging of ironmaking raw materials according to the present invention.

Referring to the schematic structural diagram of the apparatus used for hot transferring and hot charging of ironmaking raw material of blast furnace FIG. 2.

The apparatus in the present embodiment includes a carbonization chamber B1 of the coke oven, a sintering machine B2, a pellet firing machine B3, a blast furnace B4, a red coke transit tank 40, a hot sinter transit tank 20, a hot pellet transit tank 30, a red coke transport wagon 100, a hot sinter transport wagon 200, a hot pellet transport wagon 300, and a material transporting and hoisting device 400.

The carbonization chamber B1 of the coke oven is connected with the red coke transit tank 40 through the red coke transport wagon 100. The sintering machine B2 is connected with the hot sinter transit tank 20 through the hot sinter transport wagon 200. The pellet firing machine B3 is connected with the hot pellet transit tank 30 through the hot pellet transport wagon 300.

The red coke transit tank 40, the hot sinter transit tank 20, the hot pellet transit tank 30 are connected with the blast furnace B4 through the material transporting and hoisting device 400, respectively.

In this embodiment, each of the transit tanks has a lining of an impact-resistant thermal insulation material, and a sealing cover disposed in the inlet of the transit tank and having a thermal insulation material disposed therein facing the tank, and has a shape such as square, rectangular, oval, cylindrical or circular shape.

In this embodiment, the material transporting and hoisting device 400 uses a vertical-horizontal hoisting device or a skew bridge hoisting device.

The apparatus of this embodiment can realize that the charging temperatures of the coke, sinter and pellet are respectively 100-1200° C., 100-1000° C. and 100-1400° C.

Embodiment 4

Referring to the schematic diagram of the method used for hot transferring and hot charging of ironmaking raw material of blast furnace in FIG. 2.

The method of this embodiment comprises: transporting mature red coke pulled out from the carbonization chamber B1 of the coke oven into the red coke transit tank 40 through the red coke transport wagon 100, transporting hot sinter generated from the sintering machine B2 into the hot sinter transit tank 20 through the hot sinter transport wagon 200, and transporting hot pellet generated from the pellet firing machine B3 into the hot pellet transit tank 30 through hot pellet transport wagon 300; and transferring the red coke, hot sinter and hot pellet in a certain ratio to the blast furnace B4 in turn and in batch through the material transporting and hoisting apparatus 400 by using the above-mentioned transit tanks 40, 20 and 30 respectively as buffering and thermal insulating containers for the red coke, hot sinter and hot pellet.

By using the buffering and thermal insulating functions of the above transit tanks 40, 20 and 30, the temperatures of the red coke, sinter, pellet and lump ore charged into the blast furnace B4 are controlled to be 100-1200° C., 100-1000° C., 100-1400° C. and an atmospheric temperature, respectively. Herein, the temperature of the pellet may also be 100-1000° C. In addition, the charging temperature of the coke may be controlled to be 300-1000° C., preferably, 500-800° C. The charging temperature of the sinter may be controlled to be 300-900° C., preferably, 500-800° C. The charging temperature of the pellet may be controlled to be 300-1000° C., preferably, 500-800° C. In this embodiment, the charging temperatures of all the above-mentioned raw materials can be 300° C., 500° C., 800° C., 900° C., 1000° C., 1200° C., 1400° C., or each of the temperatures in the above ranges of charging temperatures of the coke, sinter and pellet, and all of them can obtain the object of hot transferring and hot charging of raw materials in the present invention.

In Embodiments 3 and 4, the red coke is also called high temperature coke.

The following beneficial effects can be achieved by making iron using the apparatus of Embodiment 3 and the method of Embodiment 4: the coke ratio is decreased by 16.3%, the blast furnace yield is increased by 30%, the quality of pig iron is improved, the investment of infrastructure apparatus is reduced, and the investment income ratio is improved.

Although in the above embodiments, the ironmaking method, the ironmaking apparatus, the apparatus for hot transferring or hot charging, and the method for hot transferring or hot charging according to the present invention all include hot transferring and hot charging apparatuses of coke, sinter and pellet at the same time, those skilled in the art would understand that the present invention is not limited thereto. For example, the apparatus of the present invention can only include a coke hot transferring and hot charging apparatus, or can also include a sinter hot transferring and hot charging apparatus or a pellet hot transferring and hot charging apparatus in addition to a coke hot transferring and hot charging apparatus. The method of the present invention can only include hot transferring and hot charging of coke, or can also include hot transferring and hot charging of sinter or hot transferring and hot charging of pellet in addition to hot transferring and hot charging of coke.

Embodiment 5

In the present embodiment, the apparatus used for hot transferring and hot charging of ironmaking raw material includes a coke hot transferring and hot charging device, which is consist of a coke oven, a high temperature coke transferring device, a high temperature coke transit silo, a high temperature coke weighing hopper, a high temperature charge transferring device, and a high temperature resistant furnace roof. The coke oven is connected with the high temperature coke transit silo through the high temperature coke transferring device. The high temperature coke weighing hopper is connected with the coke transit silos through pipelines or a closed chute. The high temperature coke weighing hopper is connected with the high temperature charge transferring device through pipelines or a closed chute. The high temperature charge transferring device is connected with the ironmaking furnace through the high temperature resistant furnace roof.

The high temperature coke transit silo is a steel structure silo, which has a lining of an impact-resistance thermal insulation material or a combination of a thermal insulation material and a heat resistant lining plate, and a sealing cover disposed in an inlet of the silo and having a thermal insulation material disposed on a side thereof facing the silo.

The high temperature charge transporting device is a closed high temperature chain-plate machine, or a combination of a closed wagon and skew bridges.

The method for hot transferring and hot charging of ironmaking raw material corresponding to the apparatus for hot transferring and hot charging of ironmaking material of the embodiment includes: directly transferring mature coke manufactured by the coke oven to the high temperature coke transit silo by the high temperature coke transferring device without being quenched; and transporting the high temperature coke into the high temperature resistant furnace roof through the high temperature coke weighing hopper and the closed high temperature charge transferring device sequentially by using the high temperature coke transit silo as buffering and thermal insulating containers for the high temperature coke, and then distributing the high temperature coke into ironmaking furnace via the high temperature resistant furnace roof according to the actual requirement.

In this embodiment, the ironmaking raw materials further include sinter and/or pellet with the same charging temperature and adding amount as those in the related art. The sinter and/or pellet may be added to the ironmaking furnace in the same manner as that in the related art. The sinter and/or pellet may also be added to the closed high temperature charge transferring device, transferred to the high temperature resistant furnace roof through the closed high temperature charge transferring device, and then distributed into the ironmaking furnace by the high temperature resistant furnace roof according to the actual requirement.

In this embodiment, the high temperature resistant furnace roof includes a high temperature resistant bell-less furnace roof or a high temperature resistant bell furnace roof.

In this embodiment, the charging temperature of the coke can be in a range of 100° C.-1200° C., or can also be in a range of 300° C.-1000° C., preferably in a range of 500-800° C. In this embodiment, the charging temperature of the coke can be 300° C., 500° C., 800° C., 1000° C., 1200° C., or other temperature points in the above ranges of charging temperature, all of which can obtain the object of hot transferring and hot charging of coke in the present invention.

Embodiment 6

The present embodiment is substantially the same with Embodiment 5, except for further including a sinter hot transferring and hot charging device. The sinter hot transferring and hot charging device is consist of a sintering machine, a high temperature sinter transferring device, a high temperature sinter transit silo, and a high temperature sinter weighing hopper. The sintering machine is connected with the high temperature sinter transit silo through the high temperature sinter transferring device. The high temperature sinter weighing hopper is connected with the high temperature sinter transit silos through pipelines or closed chute. The high temperature sinter weighing hopper is connected with the high temperature charge transferring device through pipelines or closed chute.

The high temperature sinter transit silo is a steel structure silo, which has a lining of an impact-resistance thermal insulation material or a combination of a thermal insulation material and a heat resistant lining plate, and a sealing cover disposed in an inlet of the silo and having a thermal insulation material disposed on a side thereof facing the silo.

The method for hot transferring and hot charging of ironmaking material corresponding to the apparatus for hot transferring and hot charging of ironmaking material of the present embodiment includes: directly transferring mature coke manufactured by the coke oven into the high temperature coke transit silo by the high temperature coke transferring device without being quenched, and transferring high temperature sinter manufactured by sintering machine into high temperature sinter transit silo by closed high temperature sinter transferring device; and transporting the high temperature coke and sinter into the high temperature resistant furnace roof through respective high temperature weighing hoppers and the closed high temperature charge transferring device sequentially by respectively using the high temperature coke transit silo and the high temperature sinter transit silo as buffering and thermal insulating containers for the high temperature coke and sinter, and then distributing them into the ironmaking furnace via the high temperature resistant furnace roof according to the actual requirement.

In addition, in the present embodiment, ironmaking raw materials further include pellet with the same charging temperature and adding amount as those in the related art. The pellet may be added to the ironmaking furnace in the same manner as in the related art, or may also be added to the closed high temperature charge transferring device, be transferred into the high temperature resistant furnace roof through the closed high temperature charge transferring device, and then be distributed into the ironmaking furnace via the high temperature resistant furnace roof according to the actual requirement.

In this embodiment, the high temperature resistant furnace roof includes a high temperature resistant bell-less furnace roof and a high temperature resistant bell furnace roof.

In this embodiment, the charging temperature of the coke may be in a range of 100° C.-1200° C., preferably in a range of 300° C-1000° C., more preferably in a range of 500-800° C. The charging temperature of the sinter may be in a range of 100° C-1000° C., preferably in a range of 300° C-900° C., more preferably in a range of 500-800° C. In this embodiment, the charging temperatures of both above-mentioned materials can be 300° C., 500° C., 800° C., 900° C., 1000° C., 1200° C., or each temperature point in the above ranges of charging temperatures of coke and sinter, all of which can obtain the object of hot transferring and hot charging of coke in the present invention.

In the present invention, three factors are mainly considered in determining the charging temperatures of coke, sinter and pellet: first, the degree of utilizing sensible heat of high temperature coke, sinter and pellet, which can reflect energy saving effect of the present invention; second, the requirement for the thermal insulation property of refractory materials, which is related to cost benefit of the present invention; third, the effect of high temperature coke, sinter and pellet on temperature distribution at the upper portion of the ironmaking furnace, in which appropriate temperature distribution at the upper portion of the ironmaking furnace can prolong the time of reduction reaction and improve effect of indirect reduction. Particularly, the higher the charging temperatures of coke, sinter and pellet are, the more sufficient the utilization of the sensible heat is, however, the requirement of thermal insulation property of refractory materials is stricter. Therefore, in the present invention, considering energy saving effect, cost benefit, and effect of indirect reduction, the charging temperatures of coke, sinter and pellet may respectively be in ranges of 300-1000° C., 300-900° C. and 300-1000° C., preferably, all the charging temperatures of coke, sinter and pellet may be in a range of 500-800° C.

Additionally, those skilled in the art would understand that the ironmaking furnace in the present invention may include a blast furnace or other types of ironmaking furnace using coke. Moreover, the pellet in the present invention may also be called pellet ore.

In the present invention, hot coke, sinter and pellet are directly transferred into the ironmaking furnace with coking, sintering and pelletizing being coupled to be operated along with the ironmaking furnace, and full-oxygen smelting being used, that is, the hydrogen-rich high temperature coke oven gas is injected through the oxygen tuyere at the lower portion and the middle and lower portion of the furnace stack at the same time. Thus, the sensible heat of ironmaking charges is sufficiently utilized, and the problem of insufficient amount of heat at the upper portion caused by smelting with pure oxygen is eliminated by using the sensible heat taken in by the high temperature charges, so that the metallic ratio of iron-containing charges can be more than 70% at the upper portion through indirect reduction, and the chemical energy of gas is sufficiently used to decrease or eliminate the loss of carbon due to direct reduction at the lower portion, thereby achieving the objects of saving energy and reducing emission. Meanwhile, the present invention can further save the investment of cooling device to allow for compact arrangement, thereby saving spaces and investment, and achieving the effects of high efficiency, energy saving, and environmental protection.

Although the present inventive conception has been shown and described in connection with the exemplary embodiments of the present invention, those skilled in the art should understand that various modifications and variations are in the range protected by the present invention without departing from the spirit and scope of the invention as defined by the appended claims.

What is claimed is:

1. A method of ironmaking, comprising:
   directly transferring coke manufactured by a coke oven into a first transmit silo through a closed first transferring device, directly transferring sinter manufactured by a sintering machine into a second transmit silo through a closed second transferring device, and directly transferring pellet manufactured by a pellet firing machine into a third transmit silo through a closed third transferring device;
   transferring the coke in the first transmit silo into a closed fourth transferring device via a first weighing hopper connected with the first transmit silo through a pipeline or a closed chute, transferring the sinter in the second transmit silo into the fourth transferring device via a second weighing hopper connected with the second transmit silo through a pipeline or a closed chute, and transferring the pellet in the third transmit silo into the fourth transferring device via a third weighing hopper connected with the third transmit silo through a pipeline or a closed chute, the coke, the sinter, and the pellet transferred into the fourth transferring device having a predetermined weight ratio; and
   distributing the coke, the sinter, and the pellet in the fourth transferring device into an ironmaking furnace to be smelt, wherein the coke, the sinter, and the pellet transferred into the fourth transferring device have temperatures of 100-1200° C., 100-1000° C. and 100-1400° C., respectively,
   wherein oxygen and preheated combustible gas are injected through a first tuyere disposed in a lower portion of the ironmaking furnace in an amount of 200-600 m$^3$ and 20-300 m$^3$ per ton of iron, respectively, while preheated combustible gas is injected through a second tuyere of the ironmaking furnace disposed above the first tuyere in an amount of 100-600 m$^3$ per ton of iron, the combustible gas being coke oven gas or natural gas having a considerable amount of hydrogen and having a temperature of 600-1200° C.

2. The method of claim 1, further comprising:
   dedusting gas discharged from a top of the ironmaking furnace, and recovering sensible heat of the gas by regenerative heat changing devices; and
   granulating liquid slag generated in the ironmaking furnace, and recovering remaining heat of the slag.

3. The method of claim 2, wherein the gas discharged from the top of the ironmaking furnace has a temperature of 250-1200° C., and is decreased below 200° C. after passing through the regenerative heat changing devices.

4. The method of claim 3, further comprising fine-dedusting the gas which is subjected to being recovered through dust removing devices to obtain clean gas and dust, wherein the clean gas is used for exchanging with coke oven gas generated during operation of the coke oven and for manufacturing of the pellet and sinter, and the dust is injected into the ironmaking furnace through the first tuyere of the ironmaking furnace.

5. The method of claim 3, wherein the remaining heat of the liquid slag is used to generate stream through a boiler, and a part the sensible heat of the gas is used to generate electric power in part and other part of the sensible heat of the gas is used too preheat the combustible gas injected into the ironmaking furnace through the first and second tuyeres.

6. The method of claim 1, wherein the coke transferred into the fourth transferring device has the temperature of 100-500° C. or 800-1200° C., the sinter transferred into the fourth transferring device has the temperature of 100-500° C. or 800-1000° C., and the pellet transferred into the fourth transferring device has the temperature of 100-500° C. or 800-1400° C.

7. The method of claim 1, wherein the coke transferred into the fourth transferring device has the temperature of 300-500° C. or 800-1000° C., the sinter transferred into the fourth transferring device has the temperature of 300-500° C. or 800-900° C., and the pellet transferred into the fourth transferring device has the temperature of 300-500° C. or 800-1000° C.

8. A method of transferring raw materials for ironmaking, comprising:
directly transferring coke manufactured by a coke oven into a first transmit silo through a closed first transferring device, and then transferring the coke in the first transmit silo into a closed fourth transferring device via a first weighing hopper connected with the first transmit silo through a pipeline or a closed chute;
directly transferring sinter manufactured by a sintering machine into a second transmit silo through a closed second transferring device, and then transferring the sinter in the second transmit silo into the fourth transferring device via a second weighing hopper connected with the second transmit silo through a pipeline or a closed chute; and
directly transferring pellet manufactured by a pellet firing machine into a third transmit silo through a closed third transferring device, and then transferring the pellet in the third transmit silo into the fourth transferring device via a third weighing hopper connected with the third transmit silo through a pipeline or a closed chute,
wherein the coke, the sinter and the pellet transferred into the fourth transferring device are to be used to distributed in to an ironmaking furnace to be smelt.

9. The method of claim 8, wherein the coke, the sinter, and the pellet transferred into the fourth transferring device have temperatures of 100-1200° C., 100-1000° C. and 100-1400° C., respectively.

10. The method of claim 9, wherein the coke transferred into the fourth transferring device has the temperature of 100-500° C. or 800-1200° C., the sinter transferred into the fourth transferring device has the temperature of 100-500° C. or 800-1000° C., and the pellet transferred into the fourth transferring device has the temperature of 100-500° C. or 800-1400° C.

11. The method of claim 9, wherein the coke transferred into the fourth transferring device has the temperature of 300-500° C. or 800-1000° C., the sinter transferred into the fourth transferring device has the temperature of 300-500° C. or 800-900° C., and the pellet transferred into the fourth transferring device has the temperature of 300-500° C. or 800-1000° C.

* * * * *